April 14, 1942.                G. E. KROLL                2,279,790
                              DATE INDICATOR
                           Filed Nov. 30, 1940

INVENTOR:
GEORGE EARL KROLL,
BY
                    ATTORNEYS.

Patented Apr. 14, 1942

2,279,790

UNITED STATES PATENT OFFICE 2,279,790

DATE INDICATOR

George Earl Kroll, Long Beach, Calif.

Application November 30, 1940, Serial No. 368,007

3 Claims. (Cl. 40—110)

This invention relates to calendars and other indicating means.

It is often convenient to have an indicating means which indicates a particular day on the calendar, which indicating means can be readily changed.

It is an object of this invention to provide a signal or visible indicator for calendars which may be readily changed.

It is a further object of this invention to provide an indicator which does not interfere with the normal use of a calendar.

It is a further object of this invention to provide an indicator which may be readily incorporated with calendars already existing.

It is a further object of this invention to provide an indicator which will tend to prevent the leaves of the calendar from curling.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing.

Figure 1:
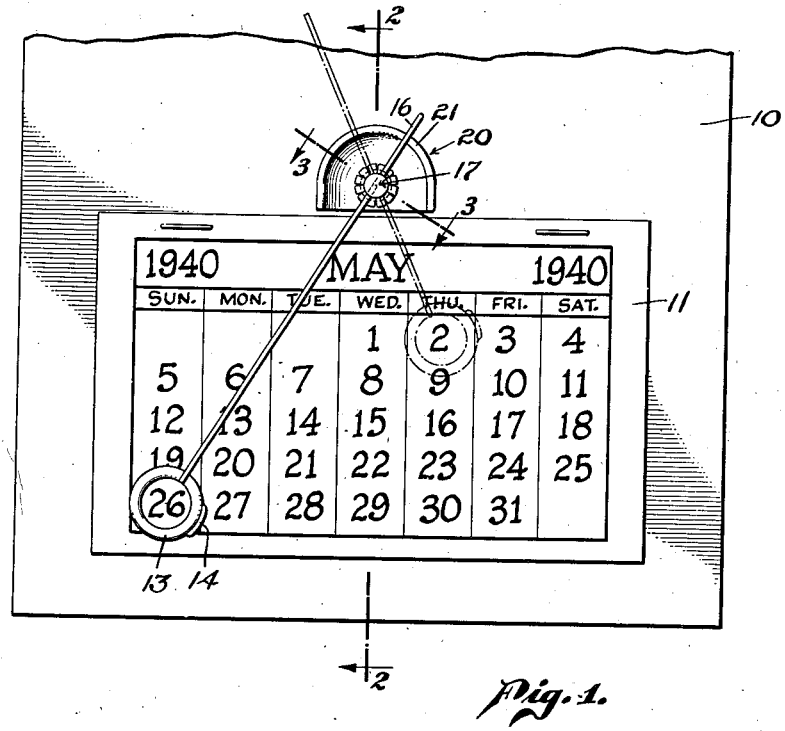
Figure 1 is a plan view of a calendar embodying one form of indicator contemplated by the present invention.

My invention is readily adaptable to the type of calendar shown in the drawing, which comprises a support or backing sheet 10 having mounted on its face a calendar pad 11 consisting of a plurality of leaves, each bearing the days of a month. The calendar leaves are sometimes small and the numbers designating the different days are necessarily spaced closely together, which make it difficult to locate a particular date on the crowded calendar area.

The above difficulty is obviated by mounting my indicator on the calendar so that it can be moved over the leaves of the calendar to selectively point out or indicate any particular date designation. In the drawing the indicator is shown as being in the form of ring 13 adapted to encircle the date designation over which it is positioned, whereby the selected date is caused to stand out from the remainder of the indicia on the calendar leaves. The means provided for mounting the ring for movement comprises a rod 16 to which the ring 13 is secured, and which is adjustably connected to a pivot member 17 secured to the base or backing sheet 10 of the calendar. This pivot is revolubly mounted on the backing sheet, in the present instance, by the utilization of a hollow rivet or eyelet 18 which serves as a bearing member for the pivot. This eyelet 18 is used for other purposes which will hereinafter appear.

As a convenient method of attaining the desired adjustability between the rod 16 and the pivot 17, the pivot is provided with a slot or aperture 19, through which the rod 16 is adapted to slide. Thus, through the combined actions of sliding the rod through the pivot, and turning the rod and pivot together, it will be clear how the degree of adjustability necessary to cover any desired area within the confines of the calendar may be attained.

Figure 2:
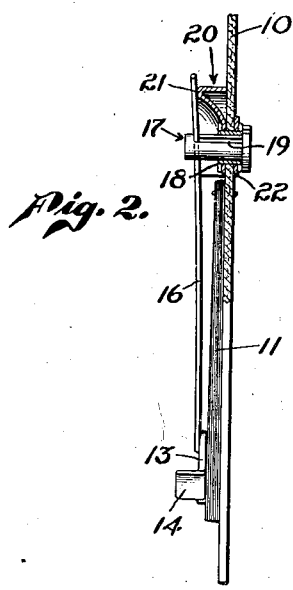
Figure 2 is a section taken on line 2—2 of Figure 1 in the direction of the arrows.
Figure 3:
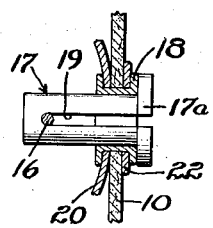
Figure 3 is an enlarged fragmentary section taken along line 3—3 of Figure 1.

As it is necessary that the ring 13 remain in the position to which it is adjusted, means is provided for causing the ring to press against the face of the calendar. This has been done by making the arm 16 of spring material and providing an abutment extending partially around the pivot on the calendar base 10, this abutment tending to force the end of the rod away from the base, thus forcing the ring 13 into close contact with the calendar leaves. This action also permits the device to function successfully in spite of the fact that as leaves are withdrawn from the calendar the pad 11 becomes thinner. The abutment 20 is in the form of a cup-shaped member having its edge 21 raised above the surface of the base 10, and preferably above the aperture 19 in the pivot member 17. The member 20 has its center depressed in order that it be capable of being fastened to the calendar backing 10 by means of the before mentioned rivet or eyelet 18 and a washer 22 on the back of the base member 10. As the edge 21 of the cup-shaped abutment member is higher than the aperture of the pivot the abutment will tend to force the ring 13 into intimate contact with the face of the calendar pad 10. The spring action of the arm gives sufficient stiffnes against movement of the parts to prevent the ring 13 from shifting under ordinary conditions of use, but, of course, permits shifting by hand when desired. The pivot 17 is held in place against withdrawal by the spring action of member 16 by means of a head 17a on the end of the pivot to the rear of the base 10, as clearly shown in Figures 2 and 3.

I claim:

1. A device for indicating portions of an area comprising, a member pivoted in a position fixed with respect to said area, said member having an aperture therethrough, an elongated member slidingly mounted in said aperture, said member having an indicator on one end thereof, and means fixed with respect to said area engaging said elongated member causing it to bear against said area.

2. A device for indicating portions of an area comprising, a member pivoted in a position fixed with respect to said area, said member having a transverse aperture therein, an elongated resilient member passing through said aperture, said member having an indicator on one end thereof, and a bearing member engaging said elongated member on a portion of its length on the opposite side of the pivoted member from the indicator and holding it against downward movement, whereby said indicator is held in engagement with the area.

3. A device for indicating portions of an area comprising, an arcuate bearing member, an eyelet passing through said bearing member and fixing it with respect to said area, a headed pivot member extending through said eyelet, said pivot member having an aperture therethrough, a resilient elongated member passing through said aperture in said pivot member and engaging said bearing member, said elongated member having an indicator on the opposite end from the arcuate bearing member, said bearing member forcing said indicator into contact with said area.

GEORGE EARL KROLL.